United States Patent [19]

Santos-Gomez

[11] Patent Number: 5,771,042
[45] Date of Patent: Jun. 23, 1998

[54] MULTI-SIZE CONTROL FOR MULTIPLE ADJACENT WORKSPACES

[75] Inventor: Lucinio Santos-Gomez, Durham, N.C.

[73] Assignee: International Business Machines Corporation, Armonk, N.Y.

[21] Appl. No.: 682,454

[22] Filed: Jul. 17, 1996

[51] Int. Cl.$^6$ ......................................................... G06F 3/00
[52] U.S. Cl. ........................... 345/342; 345/346; 345/145; 345/349
[58] Field of Search ..................................... 345/326–358

[56] References Cited

U.S. PATENT DOCUMENTS

| | | | |
|---|---|---|---|
| 5,072,412 | 12/1991 | Henderson, Jr. et al. | 395/159 |
| 5,289,574 | 2/1994 | Sawyer | 395/157 |
| 5,335,323 | 8/1994 | Kolnick | 395/164 |
| 5,371,847 | 12/1994 | Hargrove | 345/342 X |
| 5,432,934 | 7/1995 | Levin et al. | 395/650 |
| 5,463,724 | 10/1995 | Anderson et al. | 395/148 |
| 5,463,726 | 10/1995 | Price | 395/155 |
| 5,487,143 | 1/1996 | Southgate | 395/157 |
| 5,499,330 | 3/1996 | Lucas et al. | 345/355 X |
| 5,528,744 | 6/1996 | Vaughton | 345/342 X |
| 5,544,300 | 8/1996 | Skarbo et al. | 345/342 X |
| 5,572,649 | 11/1996 | Elliott et al. | 345/342 X |
| 5,621,874 | 4/1997 | Lucas et al. | 345/355 X |

*Primary Examiner*—John E. Breene
*Attorney, Agent, or Firm*—Jeanine S. Ray-Yarletts

[57] ABSTRACT

Methods, data processing systems or program products which provide a user interfaces capable of controlling the size of multiple workspaces with limited user input. The size of workspaces is controlled by connecting workspaces to create a single size control separator for borders of workspaces which are aligned with the border of adjacent workspaces. Simultaneously resizing of the connected workspaces is done utilizing the single size control separator for the connected workspace and is based upon translation of the size control separator. The border of a workspace may be snapped to the border of an adjacent workspace to connect the workspaces. Additionally, Size of a workspace may be controlled by connecting common corners of at least three adjacent workspaces to create a corner single size control separator for all at least three adjacent workspaces. The connected workspaces are resized utilizing the corner single size control separator based upon the translation of the corner single size control separator. The corner of a workspace may be snapped to the corner of adjacent workspaces to connect the workspaces and create the corner single size control separator.

30 Claims, 5 Drawing Sheets

MULTI-SIZE CONTROL FOR MULTIPLE ADJACENT WORKSPACES

FIELD OF THE INVENTION

The present invention relates generally to user interfaces for computers. More particularly, the present invention relates to multiple workspaces in a user interface environment.

BACKGROUND OF THE INVENTION

Increases in processing capability and decreases in the cost of personal computers has led to the proliferation of personal computers in all aspects of society. Personal computers are utilized in schools, homes and in business. Furthermore, with the decreased costs of personal computers, it has become more feasible from a cost perspective to use computers for tasks, and to carry out functions, which were previously done without the use of computers.

With the proliferation of computers throughout numerous aspects of life has come a trend to graphic user interfaces which make using a computer more intuitive. Examples of such graphic user interfaces include IBM OS/2®, Apple® Macintosh®, and Microsoft Windows®. These operating systems all rely on a "window like" workspace for applications, operating system information, such as directory information, and program groupings. Multiple workspaces may be displayed on the screen of a computer display device simultaneously in what is often referred to as a "desktop" Workspaces within a desktop are defined by a border which surrounds the workspace and may also include a title bar and in some cases a series of menu choices which may manage the appearance and contents of the workspace. In combination with a pointing device, workspaces may be independently moved and resized by "dragging" a border to a new location. Resizing a workspace may also be accomplished by dragging a corner of a workspace which simultaneously resizes the workspace in two directions.

Multiple workspaces on a desktop may be displayed in two primary ways. Workspaces may overlap each other and obscure workspaces beneath the topmost workspace in what is often referred to as a "cascade" or workspaces may be "tiled" across the screen so that the borders of the workspace align with each other. Furthermore, workspaces may be independently moved about the screen to relocate the workspace on the desktop.

As a result of the increased complexity and the multitasking or multi-thread capabilities of modern graphic interface operating systems such as OS/2®, it has become more and more likely that multiple workspaces will be open on the desktop simultaneously. Furthermore, with ever increasing size and resolution capabilities of display devices for computers it becomes more likely that a meaningful presentation of multiple workspaces is possible. This increase in the use of multiple workspaces has resulted in the proliferation of workspaces on a user's desktop. As windows have proliferated a user is presented with the task of resizing the windows to prevent the overlap of windows from obscuring relevant information.

To the best of the inventor's present knowledge, present user interfaces only allow of independently sized and positioned workspaces or workspaces which bear a fixed relationship between each other. Thus, as a user opens new workspaces the older workspaces may be overlapped and obscured. When the user resizes one workspace the remaining workspaces open on the desktop are not resized and the user is required to resize each workspace individually to correct for overlap of multiple workspaces that the user desires to be visible.

Alternatively, as a user opens an application, such as Windows® Explorer, which has a fixed number of resizeable subdivisions in the application workspace, the size of each subdivision is specified by the application. Furthermore, the number of subdivisions of the workspace is constant in that, for example, only two subdivisions of the workspace are present. Finally, these subdivisions are permanently connected so that they are in a fixed relationship with each other. Thus, a degree of flexibility of the user interface is sacrificed when the application has resizeable subdivisions of its workspace.

In view of the above, it is apparent that the increase in use of graphical user interfaces and the increased capabilities of computer has brought about a need for improvements in the manipulation of workspaces in these user environments.

OBJECTS AND SUMMARY OF THE INVENTION

In view of the above limitations of existing user interfaces, it is an object of the present invention to provide user interfaces which increase the flexibility of manipulation of workspaces in a user interface.

It is a further object of the present invention to provide user interfaces that reduce the amount of manipulation of workspaces required to resize multiple workspaces in a user interface.

Yet another object of the present invention is to provide user interfaces which reduce the amount of overlapping of workspaces and increase the ease with which overlapping of workspaces may be remedied to provide multiple simultaneously useable workspaces in a user interface.

In contrast to prior art interfaces known to the present inventor, the present invention allows for resizing of multiple window subdivisions and allows for relocation of the subdivisions and altering the spatial relationship of subdivisions. Furthermore, the present invention allows for resizing of multiple workspaces with a minimum of user input. These features of the present invention allow a user to minimize the clutter of the desktop of the user interface by allowing the user to quickly and easily resize workspaces to take full advantage of the graphic user interface.

These and other objects of the present invention are provided by methods, data processing systems or program products which provide a user interface capable of controlling the size of multiple workspaces with limited user input. The size of workspaces are controlled by connecting workspaces to create a single size control separator for borders of workspaces which are aligned with the border of an adjacent workspace. Resizing of the connected workspaces may be done utilizing the single size control separator for the connected workspaces and is based upon translation of the size control separator.

In a further embodiment of the present invention, the border of a workspace may be snapped to the border of an adjacent workspace to connect the workspaces and create a single size control separator for the borders of the adjacent workspace when the border of a workspace may be moved to within a predetermined distance from the border of an adjacent workspace. In such a further embodiment, the predetermined distance may be defined by user input.

In one embodiment of the present invention, the translation of the size control separator is restricted to normal to the direction of the size control separator.

In an alternative embodiment of the present invention, the size of a workspace is controlled by connecting common corners of at least three adjacent workspaces to create a corner single size control separator for all three adjacent workspaces. The connected workspaces are resized utilizing the corner single size control separator based upon the translation of the corner single size control separator.

In a further embodiment of the present invention the corner of a workspace is snapped to the corner of adjacent workspaces to connect the workspaces and create the corner single size control separator for the corners of at least three adjacent workspaces when the corner of a workspace is moved to within a predetermined distance from the common corners of the adjacent workspaces. In such an embodiment, the predetermined distance may be defined by user input.

In a further alternative embodiment of the present invention, the translation of the corner single size control separator is unconstrained. The resizing of the workspaces resizes the workspaces based upon the vertical and horizontal translation of the corner single size control separator.

Combinations of the alternative embodiments described may also be utilized wherein workspaces having a corner single size control separator are also connected to create a border single size control separator for borders of workspaces which are aligned with the border of an adjacent workspace. Resizing connected workspaces may be accomplished utilizing the border single size control separator for the connected workspace based upon translation of the border single size control separator. In an further embodiment, the border of a workspace may be snapped to the border of an adjacent workspace to connect the workspaces and create a border single size control separator for the borders of the adjacent workspace when the border of a workspace is moved to within a predetermined distance from the border of an adjacent workspace.

As will be appreciated by those of skill in this art, the above described aspects of the present invention may also be provided as apparatus or computer program products and is particularly well suited to program tools or applications that launch multiple workspaces of related tasks.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
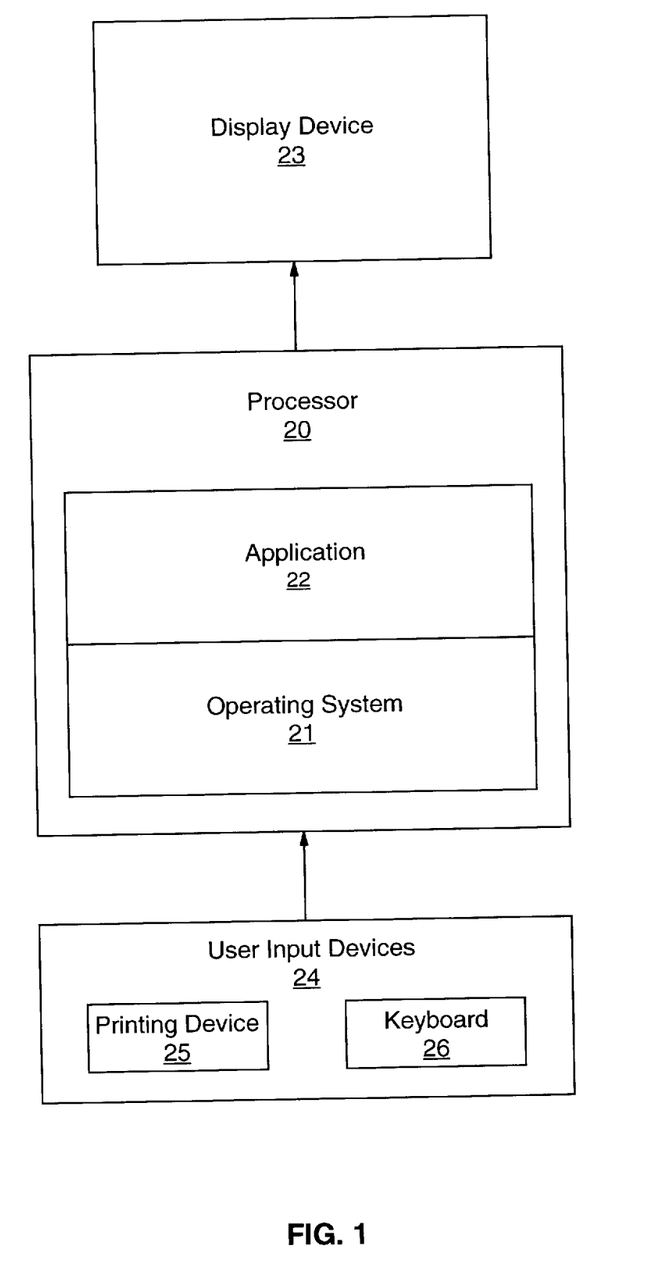
FIG. 1 is a block diagram of a system utilizing the present invention.

FIG. 1 illustrates a data processing system on which user interfaces according to the present invention may be utilized. As seen in FIG. 1, a data processor 20 may have an operating system 21 resident in the processor 20. An application 22 may be running on the operating system 21. The processor 20 displays information on a display device 23. The display device 23 has a plurality of picture elements (collectively referred to as a screen) which may define the appearance of a user interface environment displayed on the display device 23. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to designate areas of the screen or locations on the screen such as, for example, the border which surrounds a workspace or the corner of a border which surrounds a workspace. Furthermore, once designated, the user interface may display a separate icon to indicate that selection of that location of the screen may translate the feature of the workspace or the workspace itself to a different location on the screen.

Figure 2:
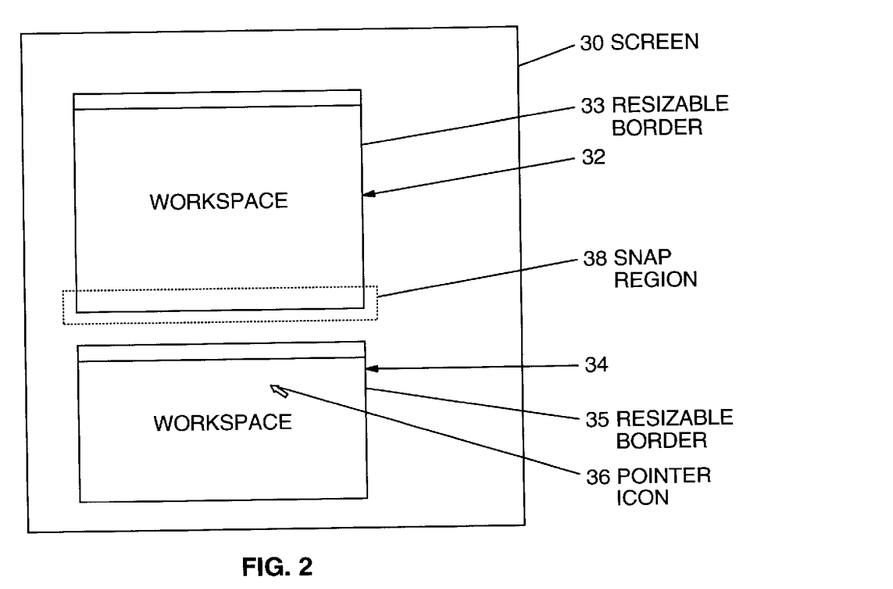
FIG. 2 is a diagram of a screen with a user interface according to the present invention having two workspaces.

FIG. 2 illustrates one embodiment of the present invention. As seen in FIG. 2 a screen 30 has a first workspace 32 and a second workspace 34 displayed on the display device 23. The screen 30 presents a user interface and may be considered, for example, a desktop as discussed above. The first workspace 32 is defined by a resizeable border 33 which circumscribes the periphery of the workspace 32. Likewise, the second workspace 34 is defined by a resizeable border 35 which circumscribes the periphery of workspace 34. Both workspaces may be resized independently by placing the icon of the pointing device 36 on their borders and then "dragging" the border to a new location of the screen 30. This resizing may occur on any of the segments of the borders 35 and 37 of the workspaces 32 and 34. Furthermore, the workspaces 32 and 34 may be relocated on the screen by placing the icon of the pointing device 36 within the workspace, selecting the workspace, and then dragging the workspace to translate the workspace from a first location of the screen 30 to a second location of the screen 30.

FIG. 2 also illustrates with dashed lines an optional "snap" region 38. As used in the art, the term "snap" refers to the operation of automatically moving a first object to a predefined location with respect to a second object when the first object is moved by the user to within a predetermined distance of the predefined location. The "snapping" operation allows for imprecision in a pointing device system in that when a user moves an object to the proximity of the predefined desired location the processor automatically completes the movement to the desired location. Often, snapping is optional and user configurable. The optional operation of the snap region 38 will be described below with respect to FIG. 3.

Figure 3:
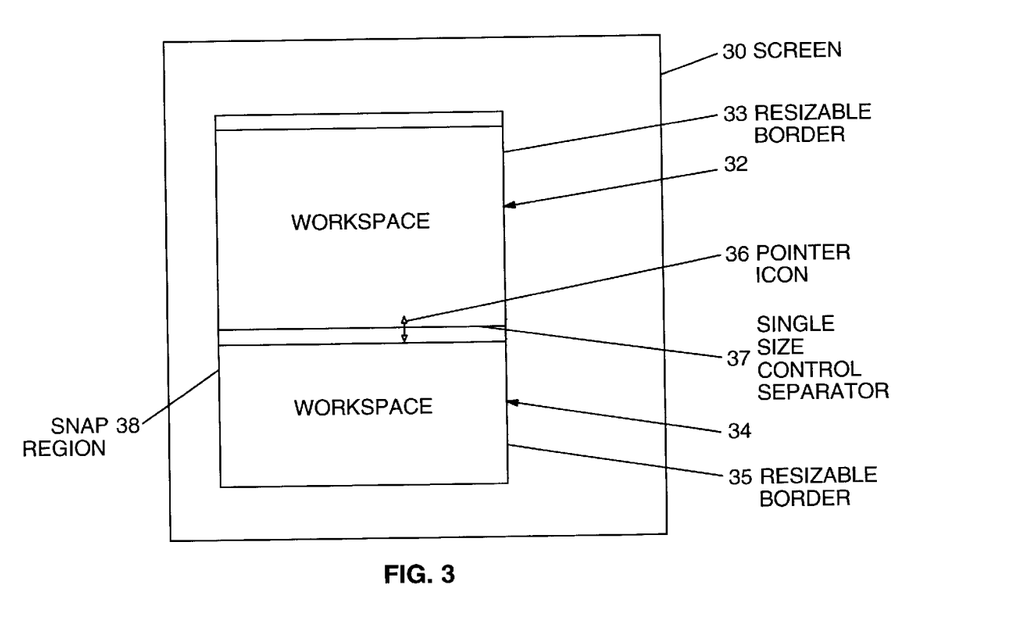
FIG. 3 is a diagram of a user interface of FIG. 2 after the two workspaces have been connected.

FIG. 3 illustrates the user interface of FIG. 2 after the second workspace 34 has been translated on screen 30 to a location adjacent to the first workspace 32. The translation of workspace 34 may be accomplished as described above or by any other means known to those of skill in the art. In the present example, the workspace 34 was translated to the position shown in FIG. 3 through the use of the pointing device 25. When the border 33 of the first workspace 32 and the border 35 of the second workspace 34 are aligned as shown in FIG. 3, the borders are connected by a single size control separator 37. The single size control separator 37 between workspace 32 and workspace 34 is created when the border of a workspace is aligned with the border of an adjacent workspace. These connected workspaces may then be resized utilizing the single size control separator 37 based upon translation of the size control separator 37. Translation of the single size control separator 37 may be accomplished utilizing the pointing device 25 by moving the pointing device icon 36 to designate the location on the screen 30 of the single size control separator 37 and then dragging the size control separator 37 to the desired location on the screen 30. As seen in FIG. 3, the icon of the pointing device 36 may change appearance to indicate that by selection at that location on the screen the single size control separator 37 may be translated on the screen 30. Furthermore, optionally the translation of the size control separator 37 may be restricted to normal to the direction of the size control separator 37. Thus, for example, in FIG. 3 the size control separator 37 would only utilize the vertical translation of the pointing device 25 as reflected by the icon of the pointing device 36 to resize the workspaces 32 and 34. Thus, resizing of two or more workspaces may be accomplished with a single drag operation utilizing the controls of the present invention.

With respect to the alignment of the borders of workspace 32 and workspace 34, the degree of alignment required before two workspaces are connected may be variable and may be set by a user option. Furthermore, as described above, workspaces may "snap" together when their borders are moved to a sufficiently close proximity. Thus, for example as shown in FIGS. 2 and 3, when workspace 34 is dragged so that its top border is within the snap region 38, then the workspaces are connected and the single size control separator 37 is created. Thus, workspaces may be connected by snapping the border of a workspace to the border of an adjacent workspace to create a single size control separator for the borders of adjacent workspaces when the border of a workspace is moved to within a predetermined distance from the border of an adjacent workspace. This predetermined distance may be defined by user input from the input devices 24.

While the above connection of workspaces has been described with respect to resizing the height or vertical dimension of the workspaces, as will be appreciated by those of skill in the art, the same connection of workspaces and resizing may be readily accomplished in the width or horizontal dimension. In such a case alignment of a vertical border between workspaces would result in the creation of a single size control separator along the vertical border and the connection of the two workspaces. Furthermore, as will be described below with respect to three and four workspaces, to the extent that multiple workspaces have aligned vertical or horizontal borders, these borders may be connected such that multiple workspaces in a row wise or columnar configuration may be resized.

Figure 4:
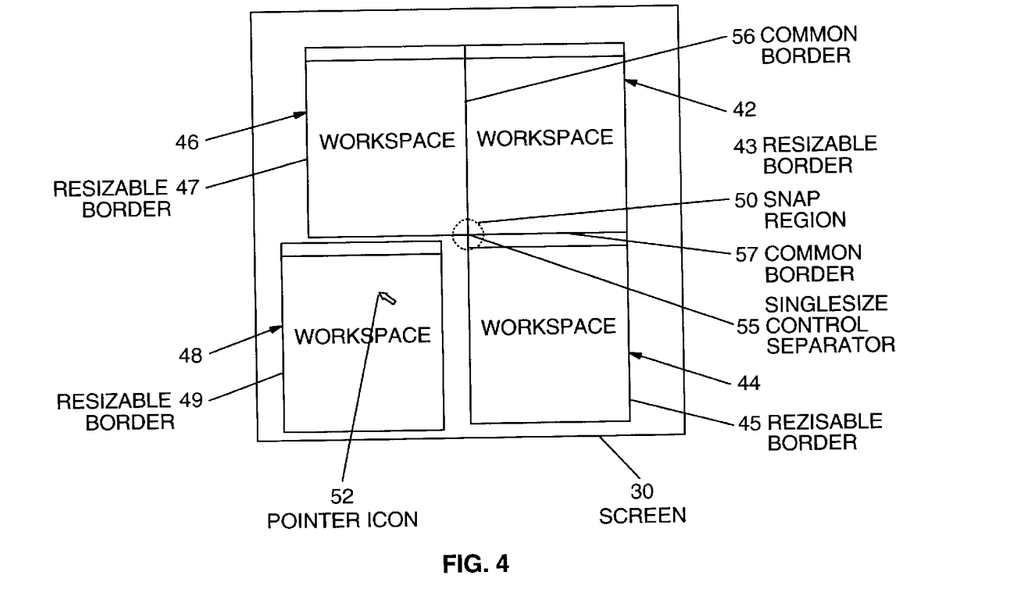
FIG. 4 is a diagram of a screen with a user interface according to the present invention having four workspaces.

Further aspects of the present invention will now be described with respect to FIGS. 4 through 6 which describe the multi-size control for more than 2 workspaces. As seen in FIG. 4, four workspaces 42, 44, 46 and 48 are illustrated as part of a user interface which is provided on a screen 30 which is displayed on display device 23. The first workspace 42 is defined by a resizeable border 43 which circumscribes the periphery of the workspace 42. The second workspace 44 is defined by a resizeable border 45 which circumscribes the periphery of the workspace 44. The third workspace 46 is defined by a resizeable border 47 which circumscribes the periphery of the workspace 46. Likewise, the fourth workspace 48 is defined by a resizeable border 49 which circumscribes the periphery of the workspace 48.

The common border sides 56 and 57 of the three workspaces 42, 44, and 46 may be single size control separators as described above. In such a case translation of the size control separator 57 would result in resizing the height of workspaces 42, 44 and 46. Similarly, translation of size control separator 56 would result in resizing the width of workspaces 42, 44 and 46. This translation may be accomplished as described above utilizing pointing device 25 and the corresponding pointing device icon 52.

Because the corners of adjacent workspaces 42, 44, and 46 are aligned, a single size control separator 55 for all three adjacent workspaces may be created at this common corner. By translating this single size control separator 55 located at the common corner of the adjacent workspaces the three connected workspaces 42, 44 and 46 may be resized based upon the translation of the single size control separator 55. This single size control separator 55 may resize both height and width of the connected workspaces. The connection of adjacent workspaces may be enhanced as described above by utilization of a snap region 50 which snaps the location of a workspace to adjacent other workspaces if a corner of the workspace is located within the snap region. This optional operation will be described below with respect to FIG. 5.

Figure 5:
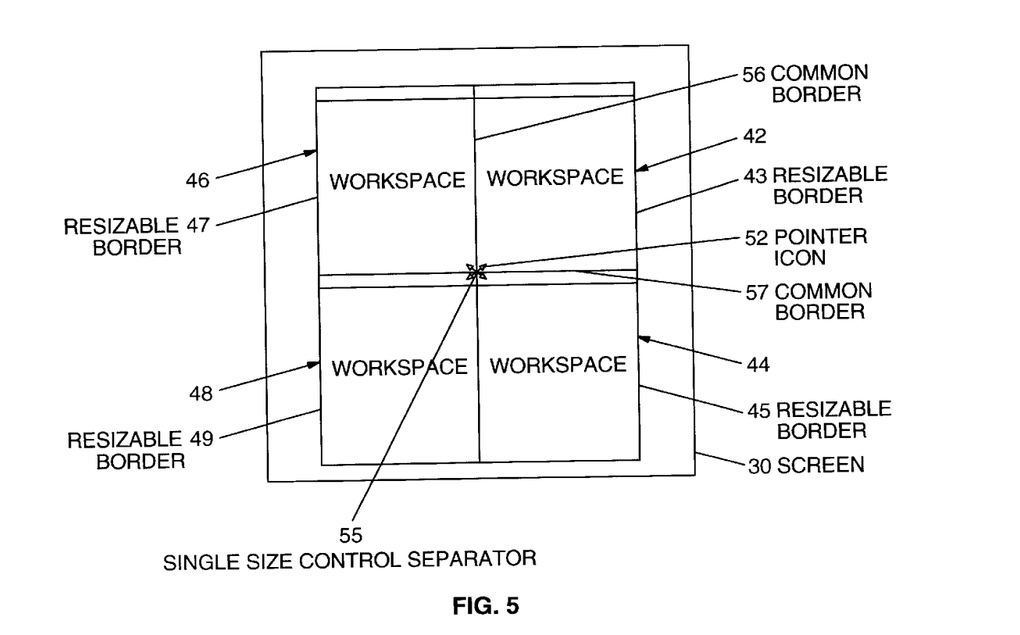
FIG. 5 is a diagram of a user interface of FIG. 4 is after the four workspaces have been connected.

Inclusion of the fourth workspace 48 is illustrated in FIG. 5. As seen in FIG. 5, workspace 48 has been connected with workspaces 42, 44 and 46. This connection has included workspace 48 in the single size control separators 56, 57 and 55. The connection of workspace 48 with the other workspaces may be accomplished by dragging workspace 48 to a location on screen 30 adjacent workspace 44 and workspace 46 or it may optionally be accomplished by dragging the upper right hand corner of workspace 49 to within the snap region 50 if the snap option is active. Thus, the workspaces may be connected by snapping the corner of a workspace to the corner of adjacent workspaces to create the single size control separator 55 for the common corner of the adjacent workspaces when the corner of a workspace is moved to within a predetermined distance from the corners of the adjacent workspaces. The predetermined distance may be defined by user input.

Once connected, the selection of the single size control separator 55 located at the common corner of the four workspaces may be indicated by a change in the icon of the pointing device 52 as illustrated in FIG. 5. As with the previous three connected workspaces, workspace 48 may have its height resized by single size control separator 57, its width resized by single size control separator 56 and both its width and its height resized by single size control separator 55. Thus, the translation of the single size control separator 55 may be unconstrained and, therefore, the resizing of the workspaces is based upon the vertical and horizontal translation of the single size control separator 55.

Figure 6:
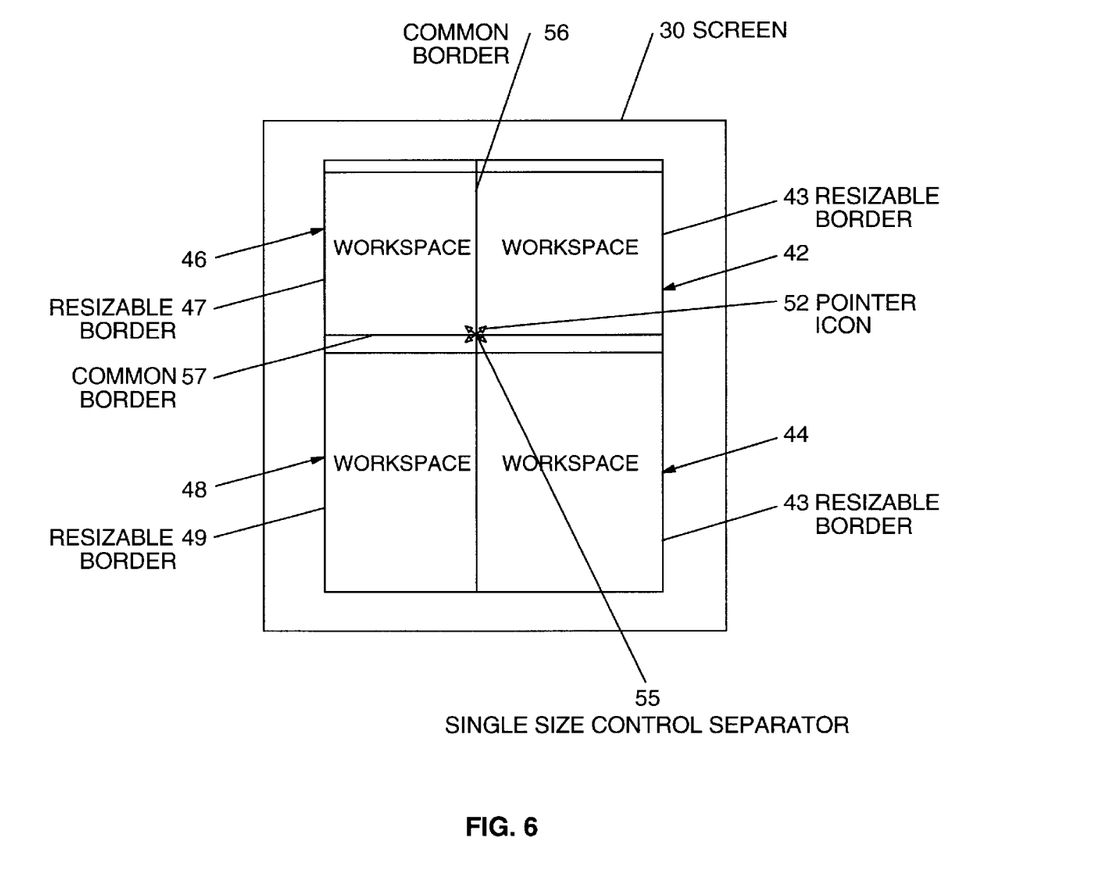
FIG. 6 is a diagram of a user interface of FIG. 4 after the four workspaces have been connected and resized.

FIG. 6 illustrates use of the corner single size control separator 55 to resize the four workspaces. As seen in FIG. 6, translation of the corner single size control separator 55 has caused workspace 42 to decrease in height and increase in width, workspace 44 to increase in height and in width, workspace 46 to decrease in height and decrease in width and workspace 48 to increase in height and decrease in width. This resizing of four workspaces was accomplished by a single translation of the corner single size control separator 55.

While the present invention has been described with respect to two, three and four workspaces, as will be appreciated by those of skill in the art, any number of workspaces may be connected and single size control separators created along the common borders. Furthermore, a user interface may include one or both of the techniques described above for reducing the amount of user input required to resize multiple workspaces. Likewise, the user interface could have workspaces which may simultaneously have both connected and unconnected workspaces.

Furthermore, workspaces could be selectively connected and disconnected by user input such that workspaces having a single-size control separator could be disconnected and resized independently.

In addition to the common border alignment described above, a single size control separator could also be created for vertically or horizontally aligned borders. Thus, for example, a single size control separator could be created for the vertically aligned border 38 of FIG. 2.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention. For example, the present examples have been illustrated with respect to a workspace and a screen, however, the present invention should not be construed as limited in that the same size control mechanism of the present invention applies equally to resizeable subdivisions of a workspace. Accordingly, as used herein the term workspace may refer to a window-like workspace on a desktop as described above or may refer to a resizeable subdivision of a workspace. In such a case, the screen 30 may be considered a "workspace" and the workspaces described herein may be considered subdivisions of the workspace 30.

Figure 7:
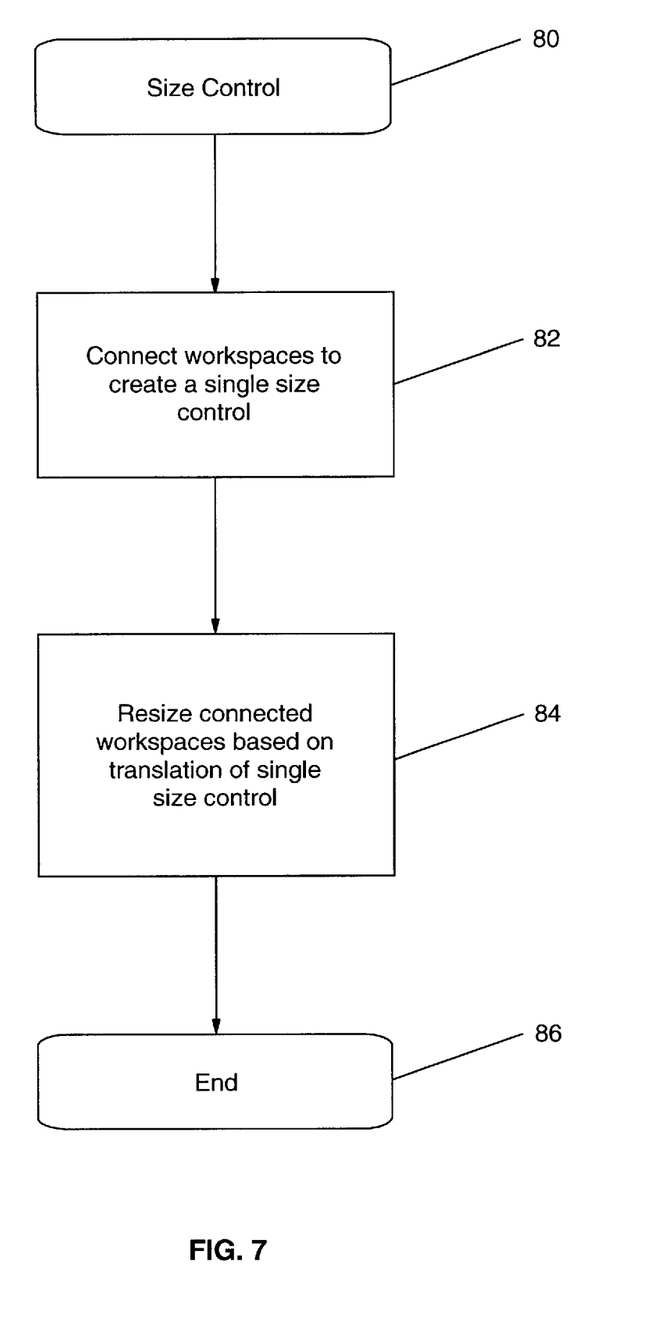
FIG. 7 is a flow chart of the operations of the present invention.

FIG. 7 is a flowchart illustration of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 7 a size control operation is initiated in block 80. The workspaces are connected to create a single size control as seen in block 82. The workspaces are then resized based on the translation of the single size control, as reflected in block 84 and the size control operation ends as seen in block 86. As will be appreciated by those of skill in the art, any of the conditions described above for connection, translation and resizing of workspaces may be implement utilizing these operations.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of controlling size of multiple workspaces in a user interface environment, the method comprising the steps of:

connecting workspaces to create a single size control separator for borders of workspaces which are aligned with the border of an adjacent workspace by snapping the border of a workspace to the border of an adjacent workspace to connect the workspaces and create a single size control separator for the borders of the adjacent workspace when the border of a workspace is moved to within a predetermined distance from the border of an adjacent workspace; and resizing connected workspaces utilizing the single size control separator for the connected workspace based upon translation of the size control separator.

2. A method according to claim 1, wherein the predetermined distance is defined by user input.

3. A method of controlling the size of multiple workspaces in a user interface environment, the method comprising:

connecting common corners of at least three adjacent workspaces to create a corner single size control separator for all of the at least three adjacent workspaces;

resizing the at least three connected workspaces utilizing the corner single size control separator based upon the translation of the corner single size control separator.

4. A method according to claim 3, wherein said connecting step further comprises the step of snapping the corner of a workspace to the corner of adjacent workspaces to connect the workspaces and create the corner single size control separator for the corners of the at least three adjacent workspaces when the corner of a workspace is moved to within a predetermined distance from the common corners of the adjacent workspaces.

5. A method according to claim 4, wherein the predetermined distance is defined by user input.

6. A method according to claim 3, wherein the translation of the corner single size control separator is unconstrained and wherein the resizing of the workspaces resize the connected workspaces based upon the vertical and horizontal translation of the corner single size control separator.

7. A method according to claim 3, further comprising:
connecting workspaces to create a border single size control separator for borders of workspaces which are aligned with the border of an adjacent workspace;
resizing connected workspaces utilizing the border single size control separator for the connected workspace based upon translation of the border single size control separator.

8. A method according to claim 7, wherein said connecting step further comprises the step of snapping the border of a workspace to the border of an adjacent workspace to connect the workspaces and create a border single size control separator for the borders of the adjacent workspace when the border of a workspace is moved to within a predetermined distance from the border of an adjacent workspace.

9. A method according to claim 7, wherein the translation of the border single size control separator is restricted to normal to the direction of the border single size control separator.

10. A method according to claim 7, wherein the predetermined distance is defined by user input.

11. A system for controlling the size of multiple workspaces in a user interface environment comprising:
a display device for displaying a user interface having at least two workspaces;
means for connecting workspaces displayed on the display device to create a single size control separator for borders of workspaces which are aligned with the border of an adjacent workspace by snapping the border of a workspace to the border of an adjacent workspace to connect the workspaces and create a single size control separator for the borders of the adjacent workspace when the border of a workspace is moved to within a predetermined distance from the border of an adjacent workspace;
means responsive to user input and said means for connecting for resizing connected workspaces utilizing the single size control separator for the connected workspace based upon translation of the size control separator.

12. A system according to claim 11, further comprising means for defining said predetermined distance based on user input.

13. A system for controlling the size of multiple workspaces in a user interface environment, the apparatus comprising:
a display device for displaying a user interface capable of having at least three workspaces;
means for connecting common corners of at least three adjacent workspaces to create a corner single size control separator for all of said at least three adjacent workspaces;
means, responsive to user input and said means for connecting for resizing said at least three connected workspaces utilizing the corner single size control separator based upon the translation of the corner single size control separator.

14. A system according to claim 13, wherein said means for connecting further comprises means for snapping the corner of a workspace to the corner of adjacent workspaces to connect the workspaces and create the corner single size control separator for the corners of the at least three adjacent workspaces when the corner of a workspace is moved to within a predetermined distance from the common corners of the adjacent workspaces.

15. A system according to claim 14, further comprising means for defining said predetermined distance based on user input.

16. A system according to claim 13, wherein the translation of the corner single size control separator is unconstrained and wherein said means for resizing resizes the connected workspaces based upon the vertical and horizontal translation of the corner single size control separator.

17. A system according to claim 13, further comprising:
means for connecting workspaces to create a border single size control separator for borders of workspaces which are aligned with the border of an adjacent workspace;
means, responsive to user input and said connecting means, for resizing connected workspaces utilizing the border single size control separator for the connected workspace based upon translation of the border single size control separator.

18. A system according to claim 17, wherein said means for connecting workspaces to create a border single size control separator for borders of workspaces which are aligned with the border of an adjacent workspace comprises means for snapping the border of a workspace to the border of an adjacent workspace to connect the workspaces and create a border single size control separator for the borders of the adjacent workspace when the border of a workspace is moved to within a predetermined border distance from the border of an adjacent workspace.

19. A system according to claim 17, wherein said means for resizing connected workspaces utilizing the border single size control separator for the connected workspace based upon translation of the border single size control separator comprises means for restricting the translation of the border single size control separator to normal to the direction of the border single size control separator.

20. A system according to claim 18, further comprising means for defining said predetermined border distance based on user input.

21. A computer program product for controlling the size of multiple workspaces in a user interface environment, the computer program product comprising:
a computer-readable storage medium having computer-readable program code means embodied in said medium, said computer-readable program code means comprising:
computer-readable program code means for connecting workspaces displayed on the display device to create a single size control separator for borders of workspaces which are aligned with the border of an adjacent workspace by snapping the border of a workspace to the border of an adjacent workspace to connect the workspaces and create a single size control separator for the borders of the adjacent workspace when the border of a workspace is moved to within a predetermined distance from the border of an adjacent workspace, computer readable program code means, responsive to user input and said computer readable program code means for connecting workspaces, for resizing connected workspaces utilizing the single size control separator for the connected workspace based upon translation of the size control separator.

22. A computer program product according to claim 21, further comprising computer-readable program code means for defining said predetermined distance based on user input.

23. A computer program product for controlling the size of multiple workspaces in a user interface environment, the computer program product comprising:

a computer-readable storage medium having computer-readable program code means embodied in said medium, said computer-readable program code means comprising:

computer-readable program code means for connecting common corners of at least three adjacent workspaces to create a corner single size control separator for all of said at least three adjacent workspaces;

computer-readable program code means, responsive to user input and said computer readable program code means for connecting common corners, for resizing said at least three connected workspaces utilizing the corner single size control separator based upon the translation of the corner single size control separator.

24. A computer program product according to claim 23 wherein said computer-readable program code means for connecting further comprises computer-readable program code means for snapping the corner of a workspace to the corner of adjacent workspaces to connect the workspaces and create the corner single size control separator for the corners of the at least three adjacent workspaces when the corner of a workspace is moved to within a predetermined distance from the common corners of the adjacent workspaces.

25. A computer program product according to claim 24, further comprising computer-readable program code means for defining said predetermined distance based on user input.

26. A computer program product according to claim 23, wherein the translation of the corner single size control separator is unconstrained and wherein said computer-readable program code means for resizing comprises computer readable code means for resizing the connected workspaces based upon the vertical and horizontal translation of the corner single size control separator.

27. A computer program product according to claim 23, further comprising:

computer-readable program code means for connecting workspaces to create a border single size control separator for borders of workspaces which are aligned with the border of an adjacent workspace;

computer-readable program code means, responsive to user input and said computer readable program code means for connecting workspaces, for resizing connected workspaces utilizing the border single size control separator for the connected workspace based upon translation of the border single size control separator.

28. A computer program product according to claim 27, wherein said computer-readable program code means for connecting workspaces to create a border single size control separator for borders of workspaces which are aligned with the border of an adjacent workspace comprises computer-readable program code means for snapping the border of a workspace to the border of an adjacent workspace to connect the workspaces and create a border single size control separator for the borders of the adjacent workspace when the border of a workspace is moved to within a predetermined border distance from the border of an adjacent workspace.

29. A computer program product according to claim 27, wherein said computer-readable program code means for resizing connected workspaces utilizing the border single size control separator for the connected workspace based upon translation of the border single size control separator restricts the translation of the border single size control separator to normal to the direction of the border single size control separator.

30. A computer program product according to claim 28, further comprising computer-readable program code means for defining said predetermined border distance based on user input.

* * * * *